US006735064B2

(12) United States Patent
Miyazaki

(10) Patent No.: US 6,735,064 B2
(45) Date of Patent: May 11, 2004

(54) INRUSH CURRENT SUPPRESSING DEVICE

(75) Inventor: Takahiro Miyazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 35 days.

(21) Appl. No.: 10/278,447

(22) Filed: Oct. 23, 2002

(65) Prior Publication Data

US 2003/0184266 A1 Oct. 2, 2003

(30) Foreign Application Priority Data

Mar. 27, 2002 (JP) ....................................... 2002-087415

(51) Int. Cl.[7] ................................................ H02H 9/00
(52) U.S. Cl. .......................... 361/58; 323/908; 323/299
(58) Field of Search ............................. 361/58, 57, 93, 361/94, 88, 106; 363/53, 49, 89, 58; 323/901, 299, 908, 277

(56) References Cited

U.S. PATENT DOCUMENTS 4,442,339 A * 4/1984 Mizuno et al. ........ 219/130.33
5,010,293 A * 4/1991 Ellersick ..................... 323/278
5,187,653 A * 2/1993 Lorenz ........................ 363/89
5,374,887 A * 12/1994 Drobnik ..................... 323/299
5,559,660 A * 9/1996 Watson et al. ................ 361/58
6,185,082 B1 * 2/2001 Yang ........................... 361/90

FOREIGN PATENT DOCUMENTS

JP 2000-175439 6/2000

* cited by examiner

*Primary Examiner*—Rajnikant B Patel
(74) *Attorney, Agent, or Firm*—Katten Muchin Zavis Rosenman

(57) ABSTRACT

An inrush current suppressing device capable of stabilizing inrush current suppression control to improve the reliability and quality of the control. A current limiting element limits an input current flowing to a power supply circuit in accordance with an input current limit value. A current detecting section detects the input current flowing through the current limiting element and converts the current to a voltage signal, and a sloping voltage signal generating section generates a sloping voltage signal proportional to a time elapsed after the start of power supply. An input current limiting section compares the voltage signal with the sloping voltage signal, and outputs the input current limit value for suppressing the inrush current while gradually increasing the limit value with rise in the sloping voltage signal during a period in which the voltage signal is higher in level than the sloping voltage signal after the start of power supply.

10 Claims, 17 Drawing Sheets

INRUSH CURRENT SUPPRESSING DEVICE

BACKGROUND OF THE INVENTION (1) Field of the Invention

The present invention relates to an inrush current suppressing device, and more particularly, to an inrush current suppressing device capable of suppressing occurrence of inrush current.

(2) Description of the Related Art

A power supply unit has a large-capacitance smoothing capacitor arranged on an input side thereof in order to generate a direct-current voltage with less pulsating component. Such an input capacitor has charge close to 0 (zero) in an initial state, and when the power supply switch is turned ON, therefore, large charging current flows instantaneously (such current is called inrush current).

The inrush current problem also arises in the case of a package of hot-line insertable/removable type (package which can be inserted into and removed from the casing of other equipment for the expansion of lines, maintenance of the equipment, etc. without disconnecting the power supply).

For example, when a package having a power supply circuit, such as a DC/DC or AC/DC converter, incorporated therein is inserted into the casing of other equipment to which electric power is being supplied, inrush current flows to the package.

If excessive inrush current is caused, a current exceeding the rated current flows through the power supply line, possibly damaging circuit elements or connectors. During a short time period after the start of power supply, therefore, the inrush current needs to be suppressed. In conventional inrush current suppressor circuits, the switching function of a transistor is utilized to suppress the peak value of inrush current caused at the start of power supply.

However, the performance of such conventional inrush current suppressor circuits depends upon the characteristic of the transistor used. Accordingly, a phenomenon occurs that the power supply circuit such as a DC/DC converter repeatedly starts and stops its operation before the transistor reaches a completely turned-ON state, with the result that the circuit operation fails to stabilize for a certain period of time after the start of power supply, lowering the reliability and quality of the device.

There has also been proposed a technique (e.g. in Japanese Patent No. 3119254) in which a constant-current circuit is provided for the detection of input current and feedback control is carried out to suppress the inrush current. This technique, however, takes no account of the relation between the operating current of a protective element for protecting the power supply circuit and the constant current to be set, and also no measures are taken to prevent a sudden rise of the inrush current at the start of power supply.

SUMMARY OF THE INVENTION

The present invention was created in view of the above circumstances, and an object thereof is to provide an inrush current suppressing device capable of stabilizing inrush current suppression control to thereby improve the reliability and quality of the control.

To achieve the object, there is provided an inrush current suppressing device for suppressing occurrence of inrush current. The inrush current suppressing device comprises a current limiting element for limiting an input current flowing to a power supply circuit in accordance with an input current limit value, a current detecting section for detecting the input current flowing through the current limiting element and converting the detected current to a voltage signal, a sloping voltage signal generating section for generating a sloping voltage signal proportional to a time elapsed after start of power supply, and an input current limiting section for comparing the voltage signal with the sloping voltage signal, and for outputting the input current limit value for suppressing the inrush current and also gradually increasing the input current limit value with rise in the sloping voltage signal during a period in which the voltage signal is higher in level than the sloping voltage signal after the start of power supply.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
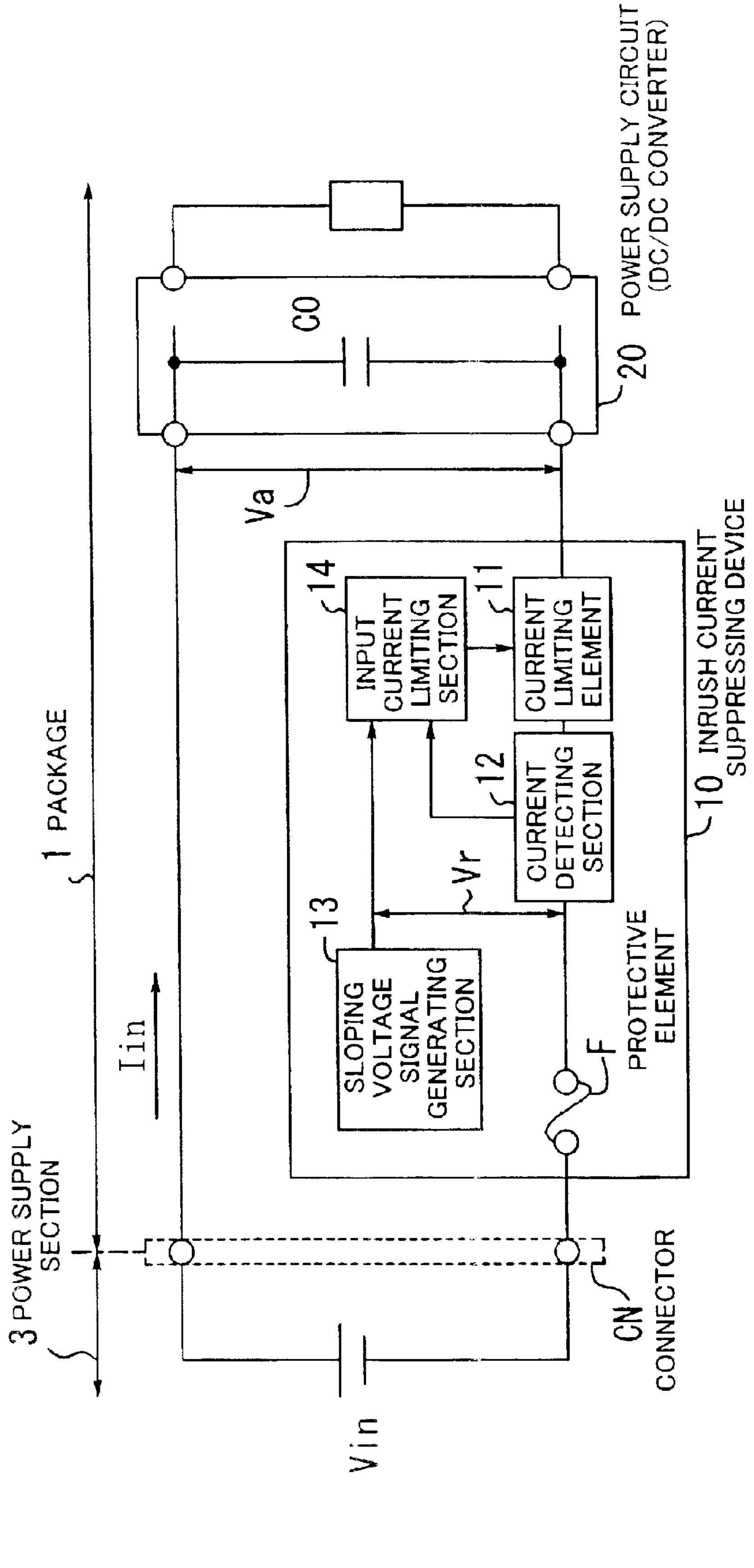
FIG. 1 is a diagram illustrating the principle of an inrush current suppressing device according to the present invention.

Embodiments of the present invention will be hereinafter described with reference to the drawings. FIG. 1 illustrates the principle of an inrush current suppressing device according to the present invention. The inrush current suppressing device 10 is arranged on a package 1 of hot-line insertable/removable type having a power supply circuit 20 (hereinafter referred to as DC/DC converter 20) incorporated therein, and suppresses inrush current that flows into the DC/DC converter 20 at the time of hot-line insertion.

The package 1 (communication device having the function of the present invention) includes the inrush current suppressing device 10, the DC/DC converter 20 and a connector CN, and is inserted at the connector CN into a power supply section 3 having a power supply Vin. On the power supply line is provided a protective element F for protecting the DC/DC converter 20 against a short-circuit current that flows in cases where a short fault has occurred in an input capacitor C0, transistor, etc. provided in the DC/DC converter 20.

A current limiting element 11 limits an input current flowing to the DC/DC converter 20 in accordance with an input current limit value supplied from an input current limiting section 14. Specifically, the current limiting element 11 comprises an FET (Field Effect Transistor). A current detecting section 12 detects the input current flowing through the current limiting element 11 and converts the detected current to a voltage signal.

A sloping voltage signal generating section 13 generates a sloping voltage signal (or merely referred to as sloping voltage) which is proportional to a time elapsed after the start of power supply (after the hot-line insertion of the package 1 or after the power supply Vin is switched ON with the package 1 connected to the power supply section 3).

The input current limiting section 14 compares the voltage signal converted to by the current detecting section 12 with the sloping voltage signal generated by the sloping voltage signal generating section 13. During a period in which the voltage signal is higher in level than the sloping voltage signal after the start of power supply and in which inrush current occurs, the input current limiting section 14 outputs the input current limit value for suppressing the inrush current. Also, the input current limit value is gradually increased with rise in the sloping voltage signal.

In the figure, the input current, the sloping voltage and the input voltage applied to the input capacitor C0 are indicated at Iin, Vr and Va, respectively. Detailed configuration and operation of the circuitry, inclusive of the concept of operation according to the present invention, will be described later.

Figure 2:
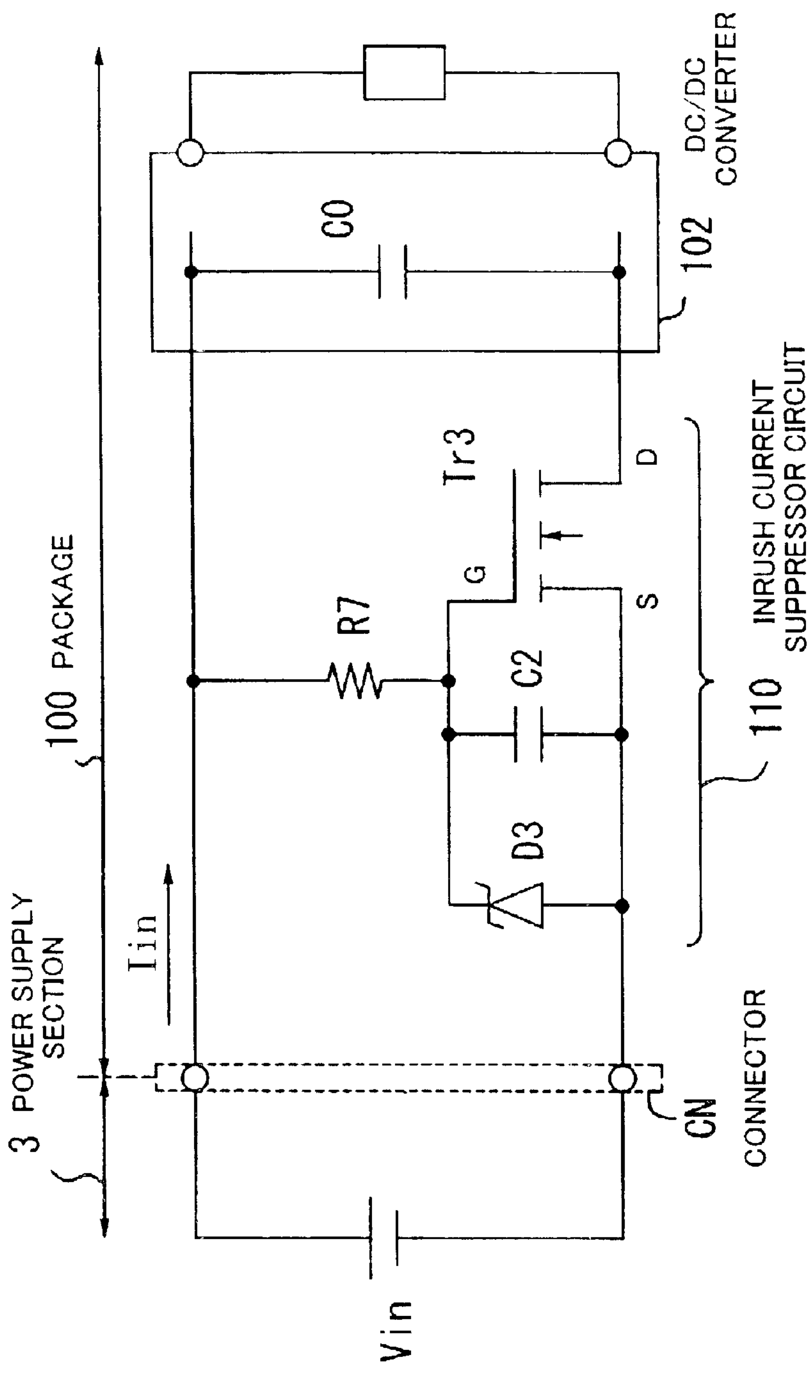
FIG. 2 PRIOR ART
FIG. 2 is a diagram showing a conventional inrush current suppressor circuit.

Problems associated with conventional inrush current suppressor circuits will be now described. FIG. 2 shows a conventional inrush current suppressor circuit. The figure illustrates a state in which a package 100 is inserted at a connector CN thereof into a power supply section 3 having a power supply Vin.

The package 100 includes an inrush current suppressor circuit 110 and a DC/DC converter 102, and the inrush current suppressor circuit 110 comprises a transistor Tr3 constituted by an FET, a Zener diode D3, a resistor R7, and a capacitor C2.

The Zener diode D3 serves as a protective circuit for preventing an overvoltage from being applied as a gate-source voltage (hereinafter gate voltage) to the transistor Tr3. The resistor R7 and the capacitor C2 constitute a time constant circuit (CR circuit) for gradually increasing the gate voltage of the transistor Tr3.

To explain the connections of the individual elements, the positive (+) side of the power supply Vin is connected to one end of the resistor R7 and one end of the input capacitor C0. The other end of the resistor R7 is connected to the cathode of the Zener diode D3, one end of the capacitor C2 and the gate of the transistor Tr3. The other end of the input capacitor C0 is connected to the drain of the transistor Tr3. The negative (−) side of the power supply Vin is connected to the anode of the Zener diode D3, the other end of the capacitor C2, and the source of the transistor Tr3.

Figure 3:
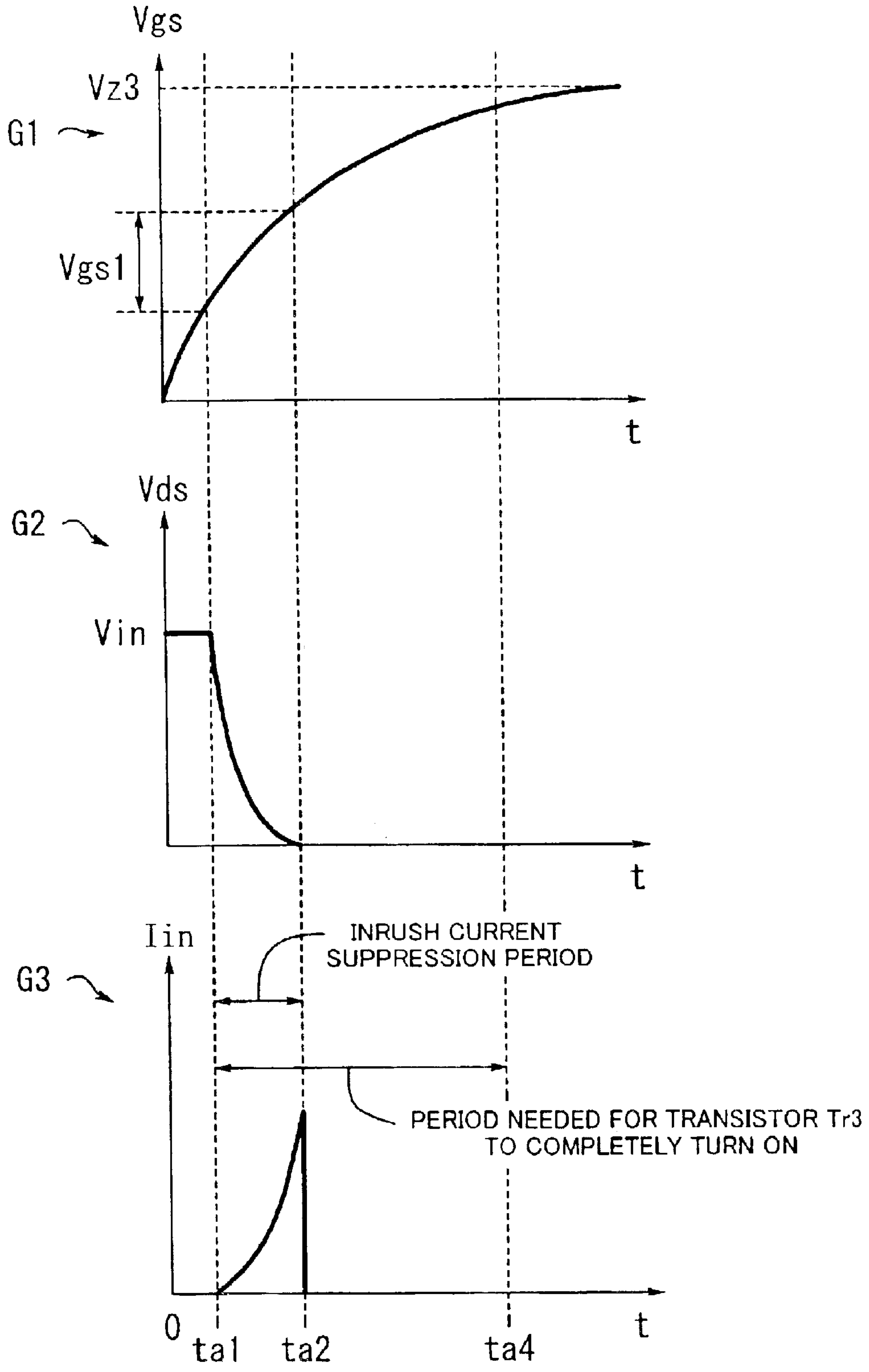
FIG. 3 PRIOR ART
FIG. 3 is a diagram illustrating operation of the inrush current suppressor circuit.

FIG. 3 illustrates operation of the inrush current suppressor circuit 110. A graph G1 shows the waveform of gate voltage Vgs of the transistor Tr3, a graph G2 shows the waveform of drain-source voltage Vds of the transistor Tr3, and a graph G3 shows the waveform of the current Iin, the horizontal axes representing a time base.

Upon start of the power supply Vin, the gate voltage Vgs of the transistor Tr3 starts to gradually increase (because the current flowing to the CR circuit charges the capacitor C2 while being restrained by the resistor R7), as shown in the graph G1.

Vz3 denotes a protection voltage (Zener voltage) of the Zener diode D3, and Vgs1 denotes a range of gate voltage Vgs in which the transistor Tr3 can suppress the inrush current.

As the gate voltage Vgs increases, the drain-source resistance of the transistor Tr3 gradually varies from infinity to several tens of mΩ (namely, OFF-to-ON transition of the transistor).

The period from time 0 (zero) to time ta1 corresponds to an OFF period of the transistor Tr3, and from the time ta1 the transistor Tr3 starts to turn ON (the period from the time ta1 to time ta4 is needed for the transistor Tr3 to completely turn ON and to allow the drain current to flow sufficiently, as explained later with reference to FIG. 5).

As for the change of the drain-source voltage Vds, since the transistor Tr3 is OFF at the start of the power supply Vin, no current (no drain current) flows between the drain and the source, and accordingly, the drain-source voltage Vds takes a value equal to the power supply Vin (from the time 0 to the time ta1), as shown in the graph G2. However, as the transistor Tr3 starts to turn ON, the flow of the drain current gradually increases, causing a drop in the drain-source voltage (from the time ta1 to the time ta2).

Consequently, from the time ta1 at which the transistor Tr3 starts to turn ON, a current limited by the drain-source resistance of the transistor Tr3 starts to flow into the input capacitor C0 in the DC/DC converter 102 in a manner such that the current gradually increases from 0 A, as shown in the graph G3, whereby the input current Iin can be moderately suppressed (from the time ta1 to the time ta2).

Figure 4:
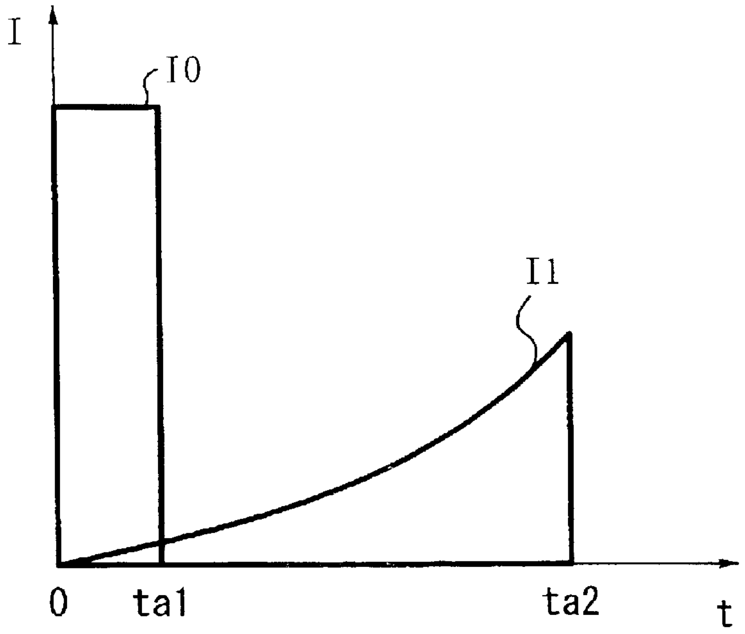
FIG. 4 PRIOR ART
FIG. 4 is a diagram showing inrush current waveforms.

FIG. 4 shows inrush current waveforms, wherein the vertical axis indicates current and the horizontal axis indicates time. A waveform 10 indicates the waveform of inrush current which is not suppressed at all, and a waveform 11 indicates the waveform (identical with that shown in the graph G3 in FIG. 3) of suppressed inrush current.

As seen from the figure, the waveform 10 instantaneously takes a large peak value at the start of power supply, while the waveform 11 shows a gentle rise and a peak value thereof is restricted to a low level. The amount of current with the waveform 10 that flows from the time 0 to the time ta1 is equal to that of current with the waveform 11 that flows from the time 0 to the time ta2 (area of waveform 10=area of waveform 11).

Figure 5:
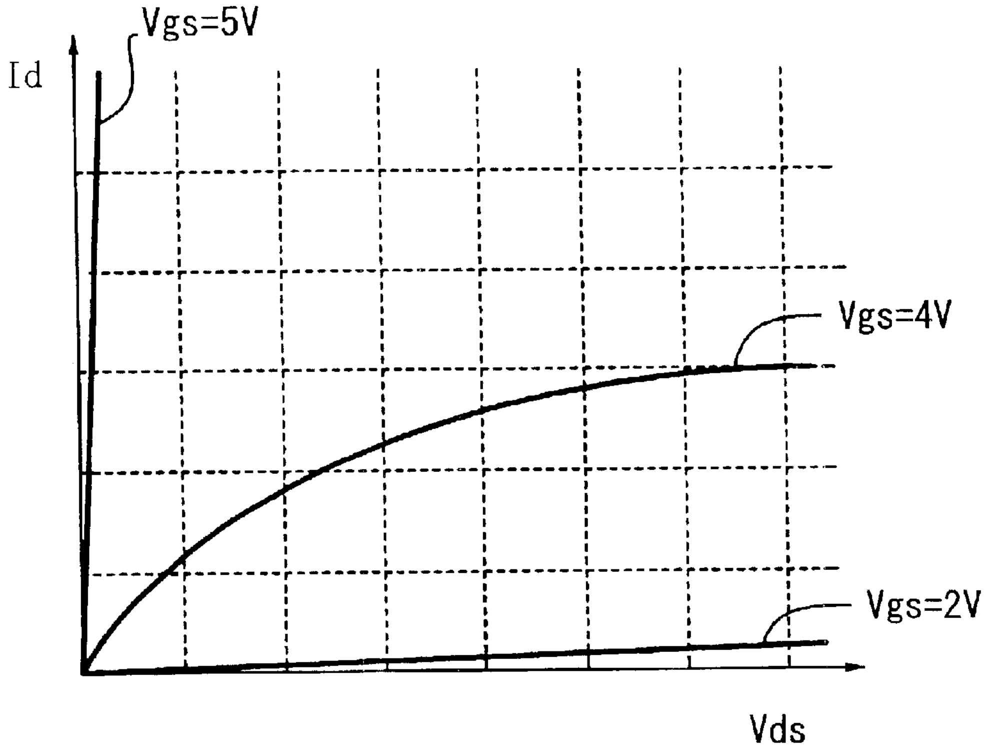
FIG. 5 PRIOR ART
FIG. 5 is a diagram showing characteristics of drain current and gate voltage of an FET.

FIG. 5 shows characteristics of the drain current and gate voltage of FET. The vertical axis indicates the drain current Id, the horizontal axis indicates the drain-source voltage Vds, and the gate voltage Vgs is plotted as coordinates in the illustrated coordinate system.

As seen from the figure, the characteristics of the drain current and gate voltage of FET are such that, where the gate voltage takes a certain value or less, the drain-source voltage Vds sharply rises even with a slight increase in the drain current Id.

In the examples shown in the figure, where the gate voltage Vgs=2 V or 4 V, the drain-source voltage Vds sharply rises (therefore, no sufficient drain current flows) even with a slight increase in the drain current Id. On the other hand, where the gate voltage Vgs=5 V, the drain-source voltage Vds does not sharply rise, so that sufficient drain current Id flows.

Consequently, because of the characteristics of FET, the drain current cannot be made to flow sufficiently before the gate voltage Vgs becomes significantly high. Namely, while the gate voltage is lower than or equal to a certain value, the drain-source resistance varies from infinity to a smaller value (OFF-to-ON transition of transistor); however, the gate voltage needs to be higher than or equal to a prescribed value in order to decrease the resistance to such a low value that the drain current flows sufficiently.

This will be considered in conjunction with the inrush current suppressor circuit 110 shown in FIG. 2. Before the gate voltage Vgs of the transistor Tr3 rises to a sufficiently high value, the drain current of the transistor Tr3, that is, the input current Iin, cannot be made to flow sufficiently.

The gate voltage Vgs of the transistor Tr3 is controlled by the CR circuit constituted by the resistor R7 and the capacitor C2. As shown in the graph G1 in FIG. 3, the gate voltage Vgs sharply rises in a short time after the start of power supply, but the rise of the gate voltage Vgs becomes gentler and gentler as the gate voltage approaches the protection voltage Vz3 of the Zener diode D3.

This indicates that the period in which the drain-source resistance is controlled is completed in a short time, but that a very long time is required for the gate voltage to reach a value such that the drain current can be made to flow sufficiently.

Figure 6:
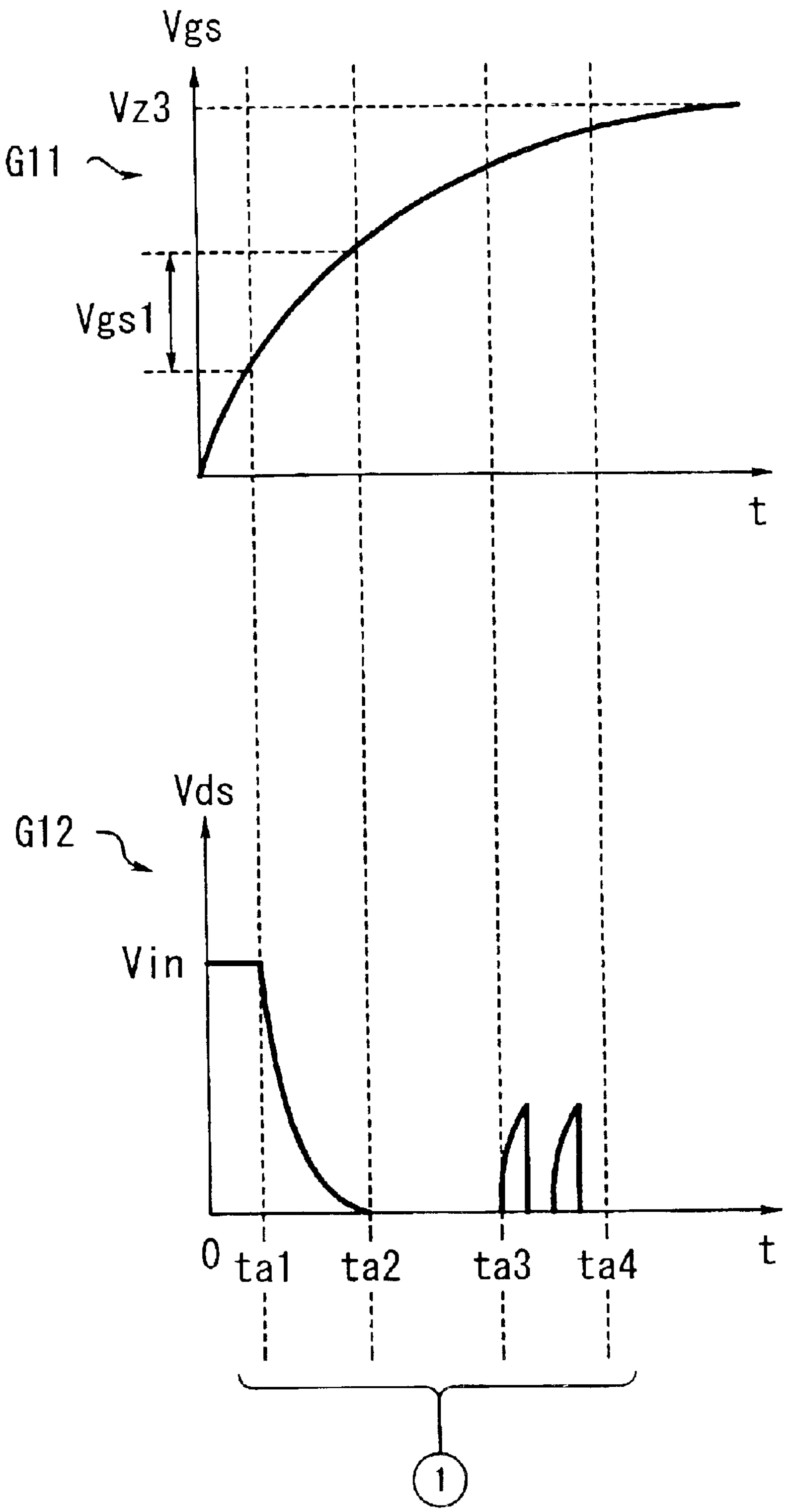
FIG. 6 PRIOR ART
FIG. 6 is a diagram illustrating a problem with the conventional inrush current suppressor circuit.
Figure 7:
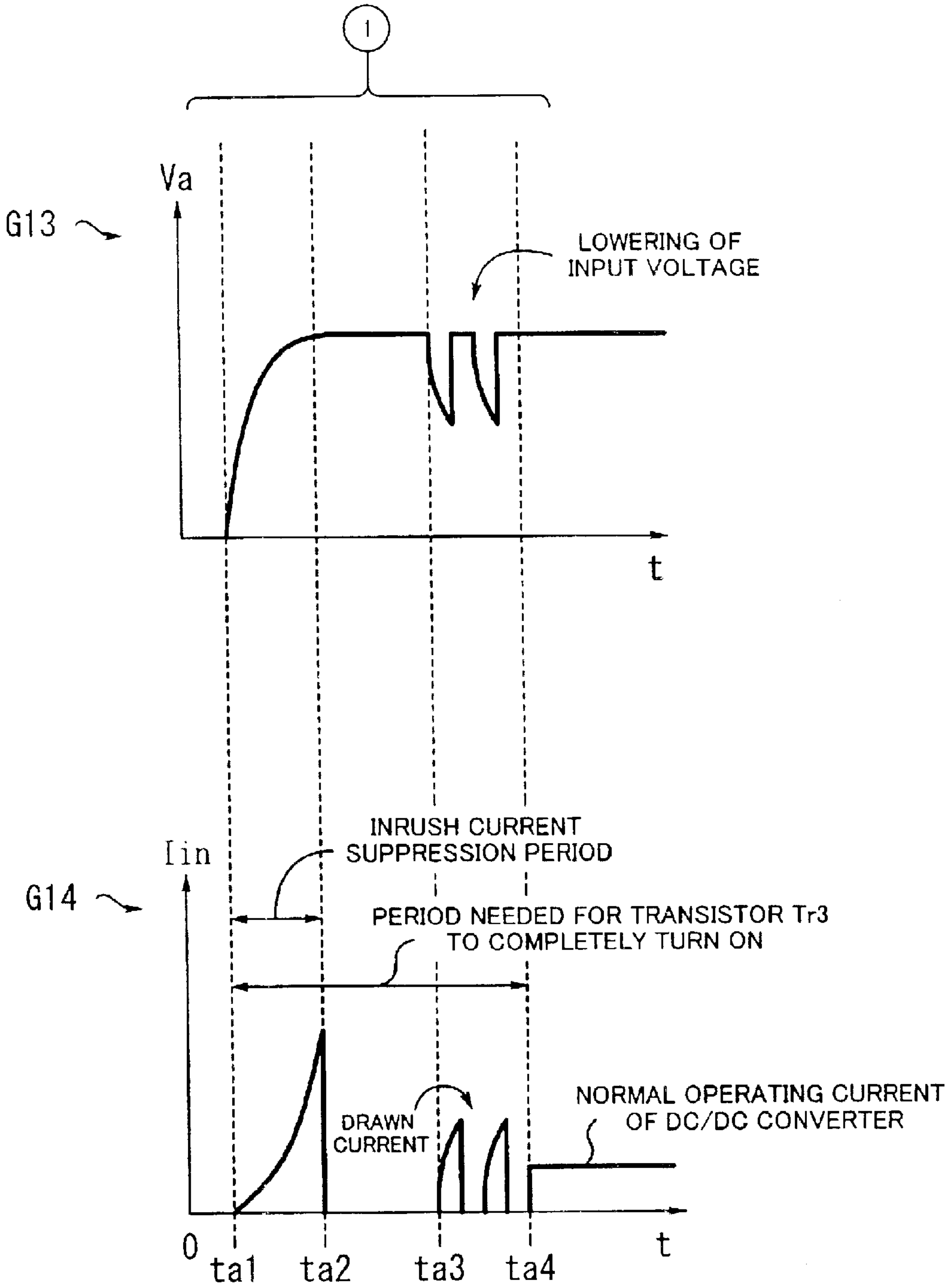
FIG. 7 PRIOR ART
FIG. 7 is a diagram also illustrating the problem with the conventional inrush current suppressor circuit.

FIGS. 6 and 7 illustrate a problem with the conventional inrush current suppressor circuit 110. A graph G11 shows the waveform of the gate voltage Vgs of the transistor Tr3, a graph G12 shows the waveform of the drain-source voltage Vds of the transistor Tr3, a graph G13 shows the input voltage Va of the input capacitor C0 (DC/DC converter 102), and a graph G14 shows the waveform of the current Iin, the individual horizontal axes representing a time base.

To explain a period from time ta3 to time ta4, while the input capacitor C0 is charged before the gate voltage reaches such a value that the drain current can be made to flow sufficiently, the DC/DC converter 102 starts operation by drawing current therein (graph G14). However, since the transistor Tr3 is not in a completely turned-ON state (apparent ON state), the gate voltage Vgs has not yet reached a value at which the drain current can flow sufficiently (in the graph G11, the voltage during the period from the time ta3 to the time ta4 is not high enough).

If sufficient current fails to flow because of incomplete ON state of the transistor Tr3, the transistor Tr3 itself acts as a resistor, causing a voltage drop. As a result, the input voltage of the DC/DC converter 102 lowers (graph G13), and since the input voltage lowers, the DC/DC converter 102 stops. Then, no current flows, so that the drain-source voltage Vds rises (graph G12).

In this manner, in the conventional inrush current suppressor circuit 110, the DC/DC converter 102 repeatedly starts and stops before the gate voltage Vgs reaches a certain value.

To solve the problem, the start of the DC/DC converter 102 may be delayed for a period within which the gate voltage can reach a value at which the drain current can flow sufficiently. However, the characteristics of the drain current and gate voltage of FET, explained above with reference to FIG. 5, are subject to variations depending on the type of FET used, as well as fluctuations in temperature etc. even if FETs of the same type are used (accordingly, the inrush current suppression characteristic also is subject to variations). With the above measure, therefore, much time is required for the measurement and evaluation and it is also difficult to always ensure stable operation.

There has also been proposed a technique wherein a constant-current circuit is provided and the input current is detected for feedback control (e.g. in Japanese Patent No. 3119254), as distinct from the aforementioned inrush current suppressor circuit 110 in which the current limiting element such as an FET is operated uncontrolledly without regard to change in the input current.

Figure 8:
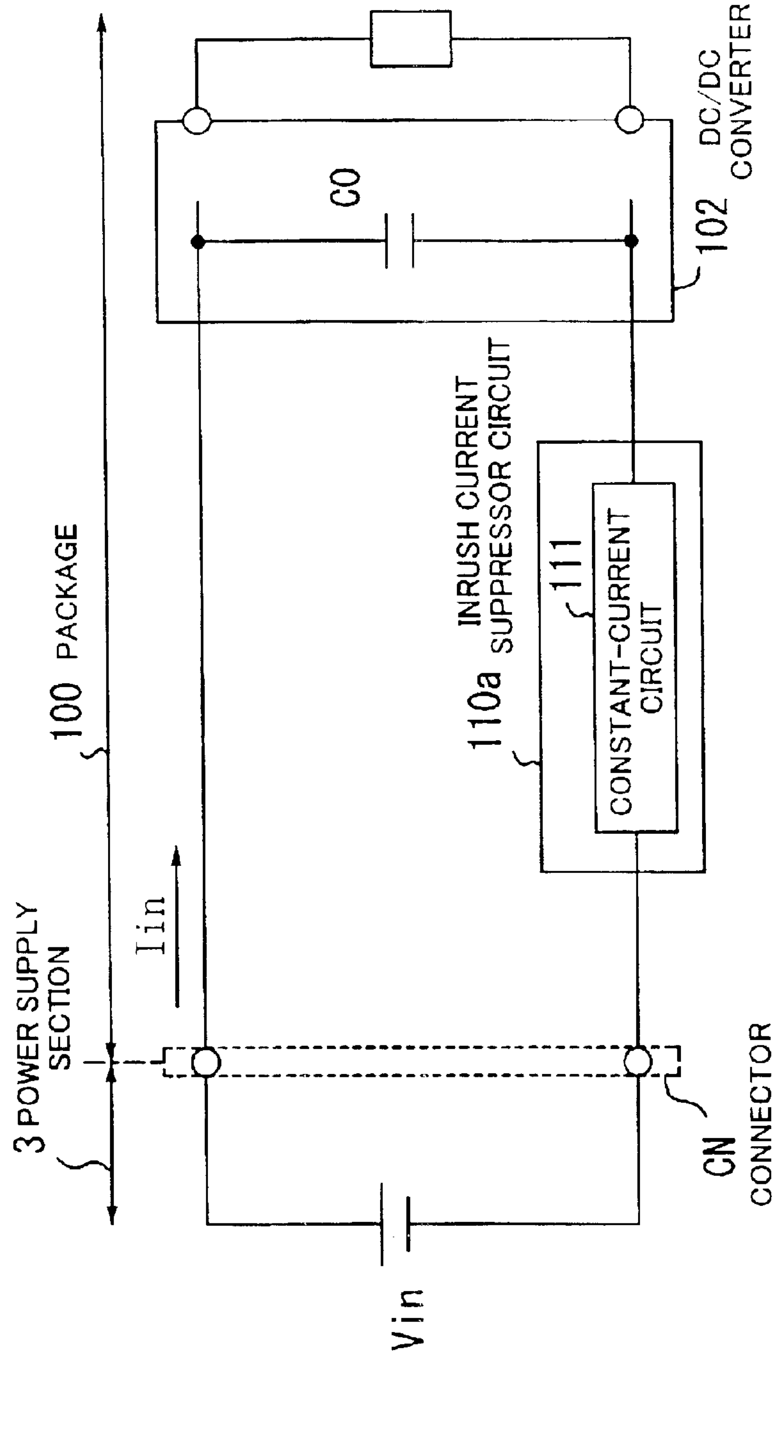
FIG. 8 PRIOR ART
FIG. 8 is a diagram showing an inrush current suppressor circuit comprising a constant-current circuit.

FIG. 8 shows an inrush current suppressor circuit comprising a constant-current circuit. In accordance with the conventional technique, an inrush current suppressor circuit 110*a* including a constant-current circuit 111 is arranged at the illustrated location so that the input current may be lower than or equal to a fixed value.

Figure 9:
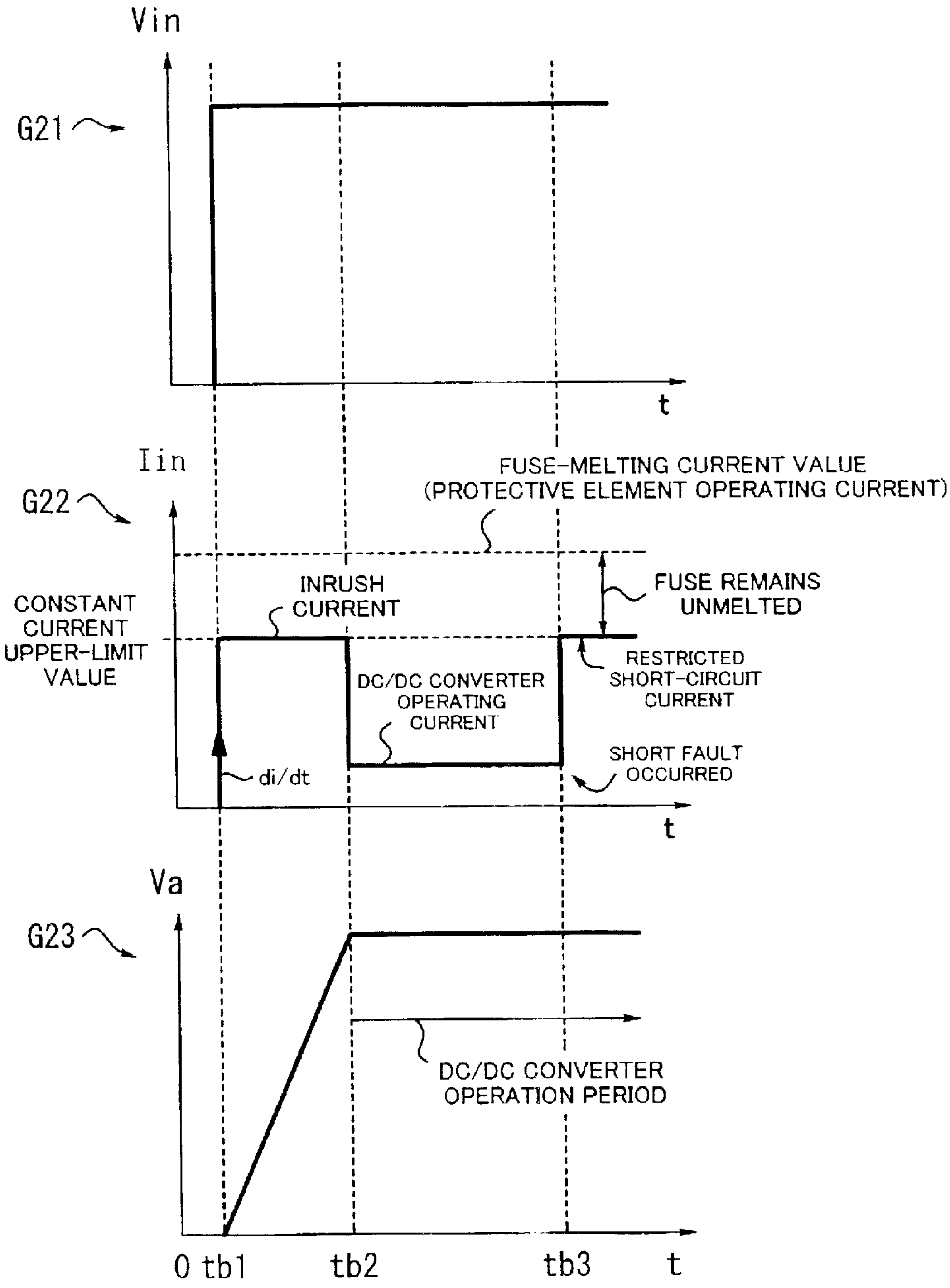
FIG. 9 PRIOR ART
FIG. 9 is a diagram illustrating operation of the inrush current suppressor circuit.

FIG. 9 illustrates operation of the inrush current suppressor circuit 110*a*, wherein a graph G21 shows the waveform of the power supply Vin, a graph G22 shows the waveform of the current Iin, and a graph G23 shows the input voltage Va, the individual horizontal axes representing a time base.

As shown in the graph G22 in FIG. 9, the inrush current is controlled to a fixed value by the constant-current circuit 111 (from time tb1 to time tb2). Also, the constant current value of the constant-current circuit 111 is set such that the relation "constant current set value=inrush current peak limit value>normal operating current of the DC/DC converter 102" is fulfilled, whereby the DC/DC converter 102 can operate without the current thereto being limited by the constant-current circuit 111.

With this inrush current suppressor circuit 110*a*, variations in the characteristics of FETs do not adversely affect the inrush current suppression characteristic because of the provision of the constant-current circuit 111. Also, even if the DC/DC converter 102 is started immediately after the inrush current flow ends, the DC/DC converter 102 can be supplied with the required current.

In general, the package containing the DC/DC converter 102 has a protective element, such as a fuse, inserted therein for input protection. In order to prevent malfunction of the protective element, it is necessary that the relation "operating current of the protective element>inrush current" should be fulfilled. However, the current is always restricted to the upper limit by the constant-current circuit 111, as shown in the graph G22 in FIG. 9, and accordingly, if a short fault occurs during operation of the DC/DC converter 102 and short-circuit current flows, the short-circuit current also is limited by the constant-current circuit 111, giving rise to a problem that the protective element does not function (the fuse does not melt).

According to the conventional technique, moreover, the inrush current rises with a steep gradient (=di/dt) at the start of power supply, as shown in the graph G22 in FIG. 9. If the current sharply rises at the time of hot-line insertion of the package, voltage lowering or noise is caused due to the resistance of wiring of the power supply side, exerting an adverse influence on other packages in the casing that are already in operation.

To solve the problem, in the inrush current suppressing device 10 according to the present invention, the input current limit value is controlled so as to increase with time, and while the inrush current flows, the relation "operating current of the protective element>input current limit value (=inrush current peak limit value)" is maintained to prevent malfunction of the protective element. Also, during operation of the DC/DC converter subsequent to the inrush current flow, the relation "operating current of the protective element<input current limit value" is maintained so that the protective element can function when a short fault has occurred in the DC/DC converter.

Further, according to the present invention, the inrush current is also gradually increased from 0 A by increasing the input current limit value with time, thereby preventing abrupt change of the inrush current. Control performed in this manner according to the present invention improves the reliability and quality of inrush current suppression.

Figure 10:
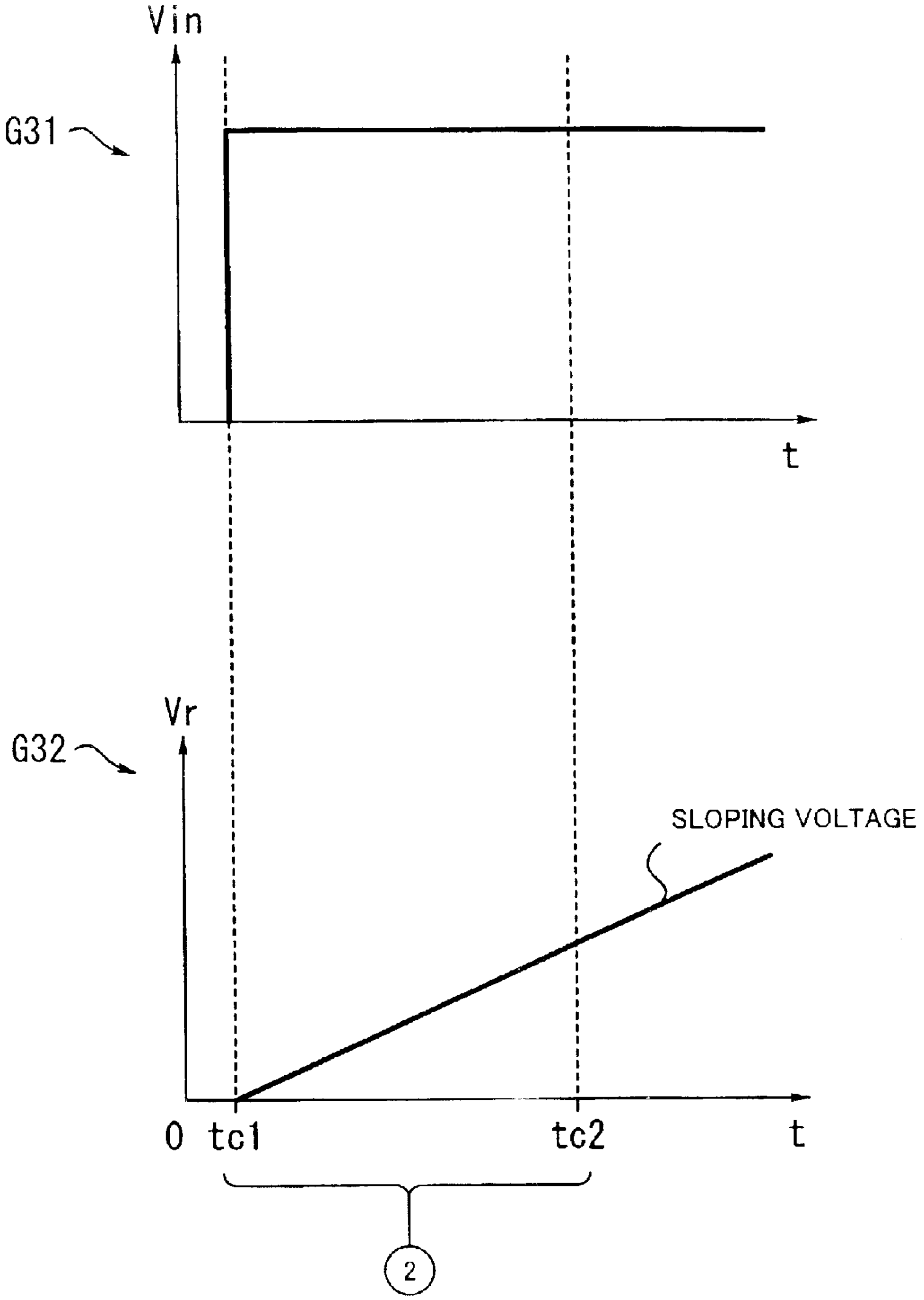
FIG. 10 is a diagram illustrating operation of an inrush current suppressing device.
Figure 11:
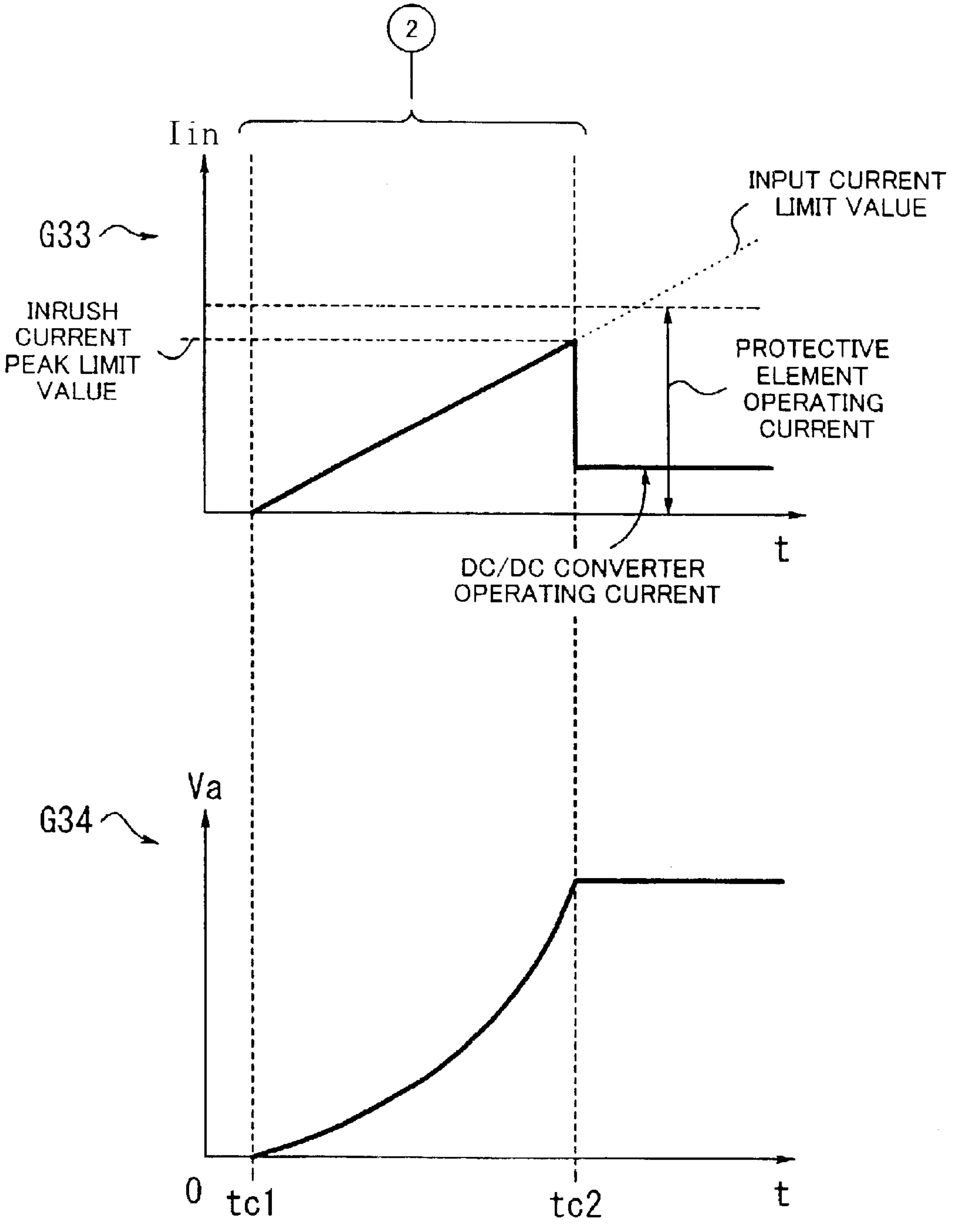
FIG. 11 is a diagram also illustrating the operation of the inrush current suppressing device.

The concept of operation of the inrush current suppressing device 10 according to the present invention will be now described with reference to FIGS. 1, 10 and 11. FIGS. 10 and 11 illustrate operation of the inrush current suppressing device 10, wherein a graph G31 shows the waveform of the power supply Vin, a graph G32 shows the waveform of the sloping voltage Vr, a graph G33 shows the waveform of the current Iin, and a graph G34 shows the waveform of the input voltage Va, the individual horizontal axes representing a time base.

During a period from time tc1 to time tc2, the power supply Vin is initiated, whereupon the sloping voltage Vr generated by the sloping voltage signal generating section 13 gradually rises (graph G32). As the sloping voltage Vr rises, the input current limit value also gradually increases, so that the inrush current, which is the charging current for the input capacitor C0, starts to flow by degrees in proportion to the increasing sloping voltage Vr (graph G33). Also, as the input capacitor C0 is charged, the input voltage Va of the input capacitor C0 gradually rises (graph G34).

At the time tc2, the increasing input voltage Va reaches the starting voltage of the DC/DC converter 20, whereupon the DC/DC converter 20 starts operation and an operating current flows. The operating current is lower than the input current limit value, and accordingly, the operating current is not limited and can be adequately supplied to the DC/DC converter 20 (graph G33).

When the DC/DC converter 20 starts operation, the sloping voltage Vr is already sufficiently high, hence the input current limit value becomes higher than the operating current of the protective element (graph G33).

Thus, the input current limit value is increased to a current value at which the protective element such as a fuse can properly function, and accordingly, even if short-circuit current flows as a result of an accidental short, the current is not limited (the input current limit value does not limit the operating current of the protective element) and the protective element such as a fuse functions properly, making it possible to protect the DC/DC converter 20.

Figure 12:
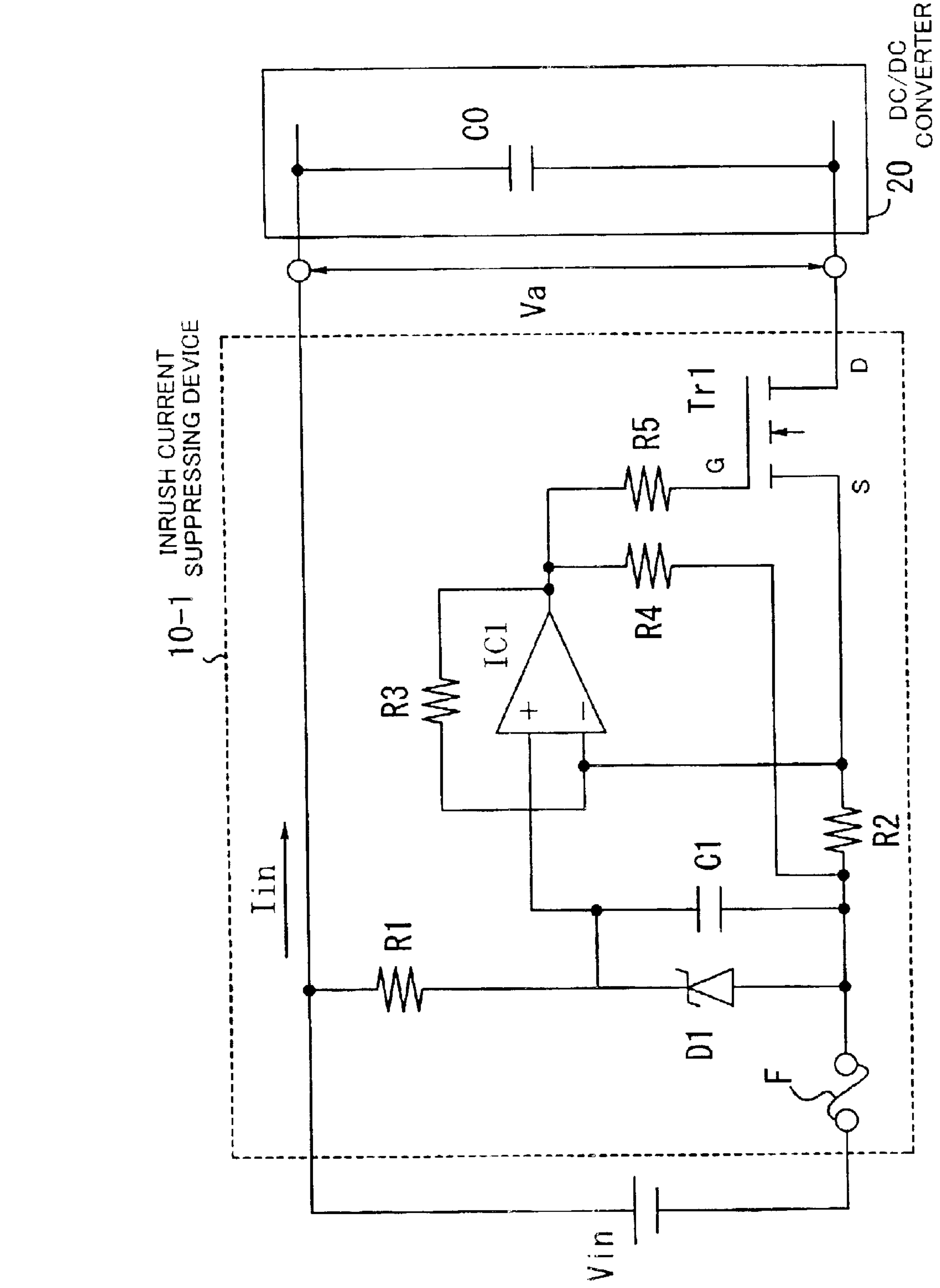
FIG. 12 is a diagram showing the configuration of an inrush current suppressing device according to a first embodiment.

Specific configuration and operation of the inrush current suppressing device 10 will be now described. FIG. 12 shows the configuration of an inrush current suppressing device according to a first embodiment. In the figure, a connector CN is omitted. To explain the connections of elements arranged inside and in the vicinity of the inrush current suppressing device 10-1, the positive (+) side of a power supply Vin is connected to one end of a resistor R1 and one end of an input capacitor C0. The other end of the resistor R1 is connected to the cathode of a Zener diode D1, one end of a capacitor C1, and an input terminal (+) of an operational amplifier IC1.

The operational amplifier IC1 has the other input terminal (−) connected to one end of each of resistors R2 and R3 and the source of a transistor Tr1, and has the output terminal connected to the other end of the resistor R3 and one end of each of resistors R4 and R5.

The other end of the input capacitor C0 is connected to the drain of the transistor Tr1, whose gate is connected to the other end of the resistor R5. The other end of the resistor R4 is connected to the other end of the resistor R2, the other end of the capacitor C1, the anode of the Zener diode D1, and one end of a protective element F (hereinafter fuse F). The negative (−) side of the power supply Vin is connected to the other end of the fuse F.

The resistor R1, the capacitor C1 (which constitutes a CR circuit in cooperation with the resistor R1) and the Zener diode D1 constitute the sloping voltage signal generating section 13, and the Zener diode D1 determines the upper limit of the sloping voltage Vr. The resistor R2 constitutes the current detecting section 12 (resistor for current detection), and the resistors R3, R4 and R5 and the operational amplifier IC1 constitute the input current limiting section 14. The transistor Tr1, which is a MOS (Metal Oxide Semiconductor) FET, constitutes the current limiting element 11.

Figure 13:
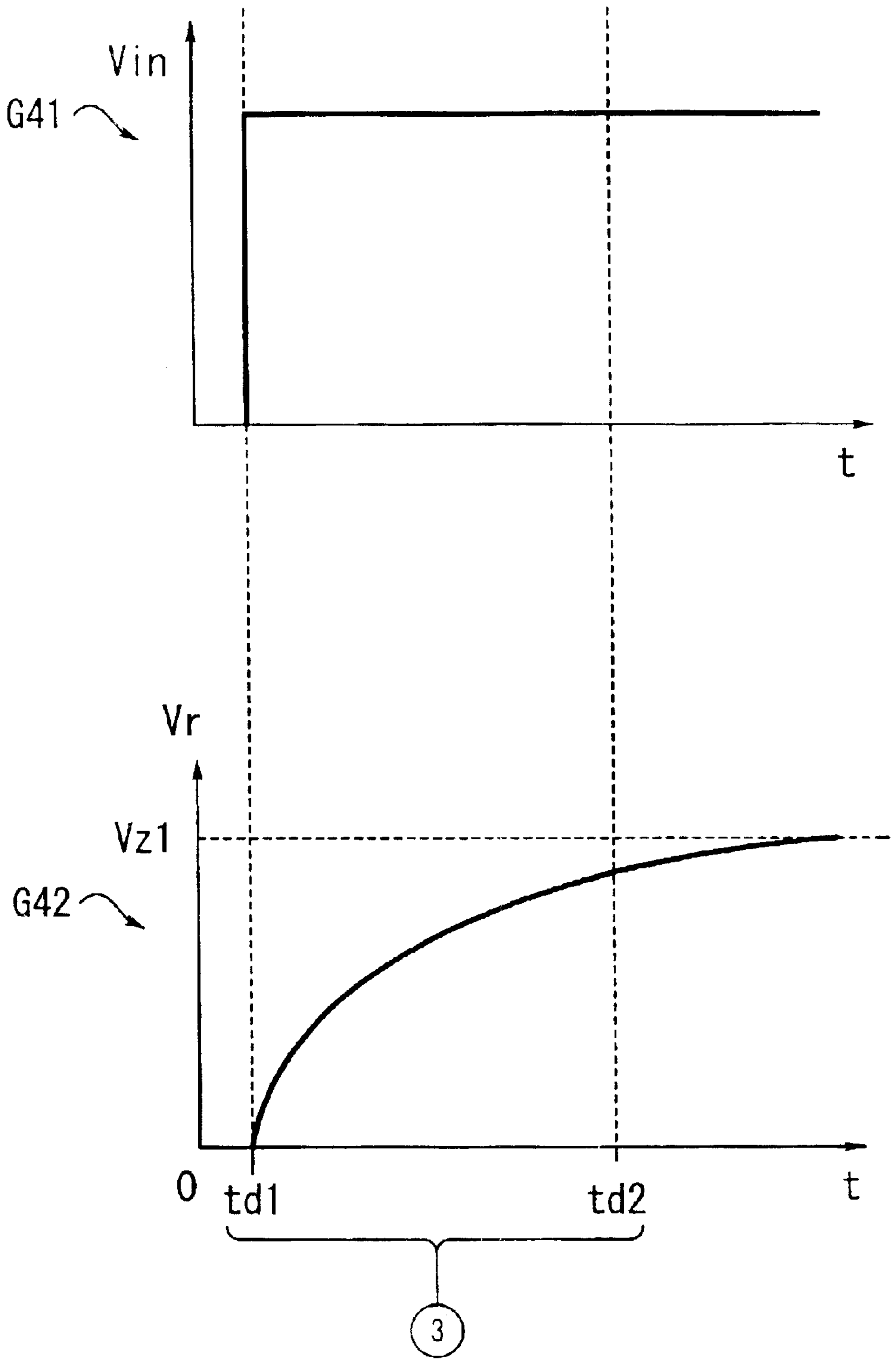
FIG. 13 is a diagram illustrating operation of the inrush current suppressing device.
Figure 14:
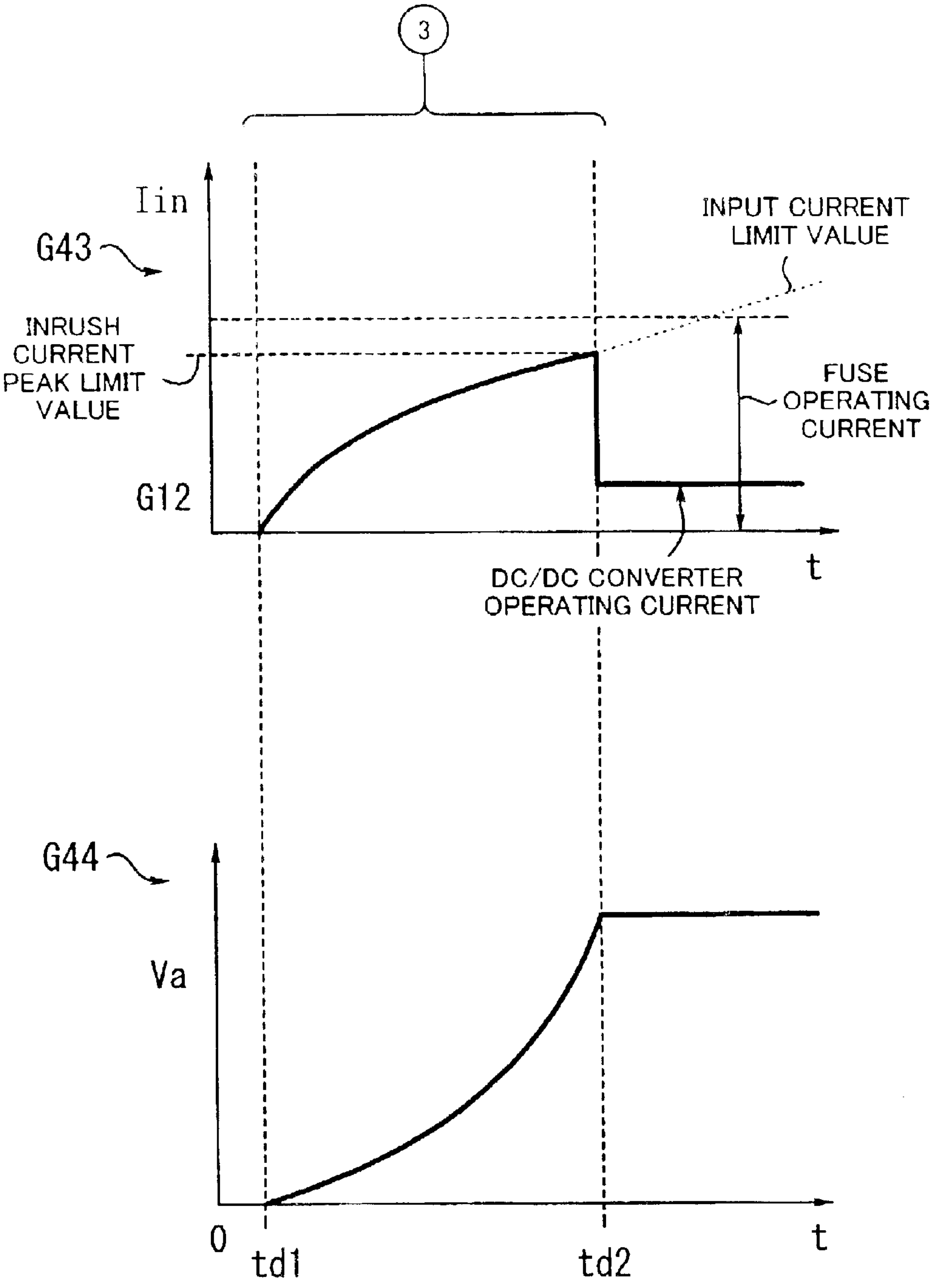
FIG. 14 is a diagram also illustrating the operation of the inrush current suppressing device.

FIGS. 13 and 14 illustrate operation of the inrush current suppressing device 10-1, wherein a graph G41 shows the waveform of the power supply Vin, a graph G42 shows the waveform of the sloping voltage Vr, a graph G43 shows the waveform of the current Iin, and a graph G44 shows the waveform of the input voltage Va, the horizontal axes all representing a time base.

Upon start of the power supply Vin, the resistor R1 starts to gradually charge the capacitor C1. Accordingly, the voltage across the capacitor C1 (=charging voltage of capacitor C1=sloping voltage Vr) gradually rises and the operational amplifier IC1 turns the transistor Tr1 ON, so that current flows into the input capacitor C0 in the DC/DC converter 20.

As the current flowing to the input capacitor C0 increases, the voltage (corresponding to the voltage signal) across the current detection resistor R2 rises. After the voltage across the resistor R2 becomes higher than the voltage across the capacitor C1, the operational amplifier IC1 causes the transistor Tr1 to limit the current flowing into the input capacitor C0 (from time td1 to time td2). During this period of time, the voltage across the capacitor C1 gradually rises, and thus the current flowing into the input capacitor C0 also keeps increasing, following the voltage rise.

After charging of the input capacitor C0 is completed, the DC/DC converter 20 operates with an operating current kept at a value below the inrush current peak value (after time td2). In this case, the voltage across the capacitor C1 continues to rise up to the protection voltage Vz1 of the Zener diode D1 and becomes larger than the operating current of the DC/DC converter 20, that is, the voltage across the resistor R2, so that the transistor Tr1 is completely turned ON by the operational amplifier IC1.

Thus, according to the present invention, even in cases where the DC/DC converter 20 operates immediately after the inrush current flow ends, the disadvantage that the input voltage of the DC/DC converter 20 lowers due to incomplete ON state of the transistor Tr1 does not arise.

Also, since the voltage across the capacitor C1 rises up to the protection voltage Vz1 of the Zener diode D1, the input current limit value is increased to a value larger than the inrush current peak value, that is, the operating current of the fuse F. Accordingly, if a short fault occurs in the DC/DC converter 20, a current large enough to melt the fuse F can be made to flow.

Figure 15:
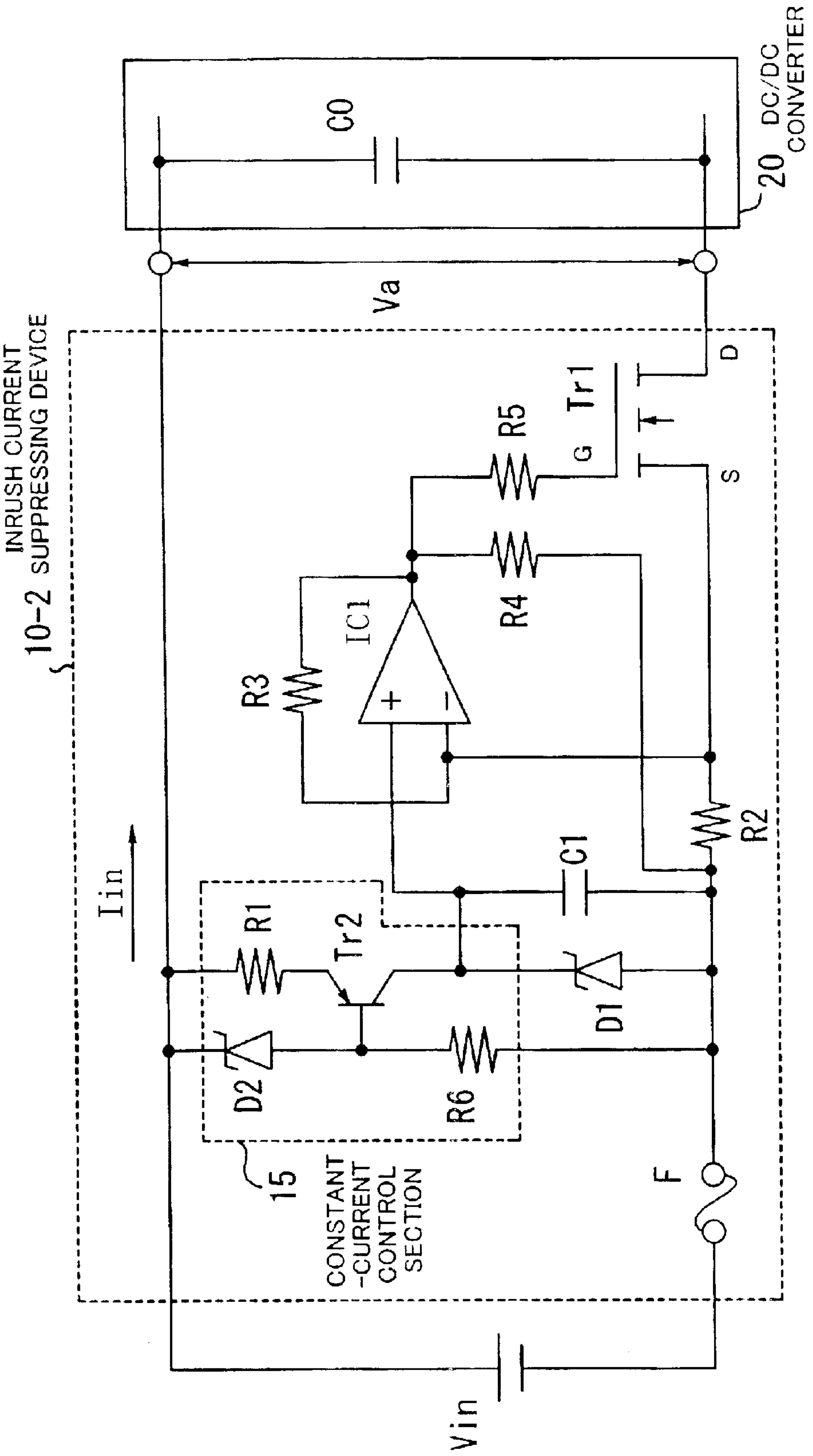
FIG. 15 is a diagram showing the configuration of an inrush current suppressing device according to a second embodiment.

FIG. 15 shows the configuration of an inrush current suppressing device according to a second embodiment. Also in this figure, a connector CN is omitted. To explain the connections of elements arranged inside and in the vicinity of the inrush current suppressing device 10-2, the positive (+) side of a power supply Vin is connected to the cathode of a Zener diode D2, one end of a resistor R1, and one end of an input capacitor C0. The other end of the resistor R1 is connected to the emitter of a transistor Tr2.

The anode of the Zener diode D2 is connected to the base of the transistor Tr2 and one end of a resistor R6, and the cathode of a Zener diode D1 is connected to the collector of the transistor Tr2, one end of a capacitor C1 and an input terminal (+) of an operational amplifier IC1.

The operational amplifier IC1 has the other input terminal (−) connected to one end of each of resistors R2 and R3 and the source of a transistor Tr1, and has the output terminal connected to the other end of the resistor R3 and one end of each of resistors R4 and R5.

The input capacitor C0 has the other end connected to the drain of the transistor Tr1, of which the gate is connected to the other end of the resistor R5. The other end of the resistor R4 is connected to the other end of the resistor R2, the other end of the capacitor C1, the anode of the Zener diode D1, the other end of the resistor R6, and one end of a fuse F. The negative (−) side of the power supply Vin is connected to the other end of the fuse F.

The illustrated circuit differs from that shown in FIG. 12 in that it is provided a constant-current control section 15. The constant-current control section 15 is constituted by the resistors R1 and R6, the Zener diode D2, and the transistor Tr2 which is of the PNP type. The capacitor C1 and the Zener diode D1 constitute the sloping voltage signal generating section 13, and the Zener diode D1 determines the upper limit of the sloping voltage Vr. The resistor R2 constitutes the current detecting section 12, the resistors R3, R4 and R5 and the operational amplifier IC1 constitute the input current limiting section 14, and the transistor Tr1 constitutes the current limiting element 11.

Operation of the constant-current control section 15 will be now described. In the following, VB, VE, VC, VBE, IB, IE, IC and hfe respectively represent the base voltage, emitter voltage, collector voltage, base-emitter voltage, base current, emitter current, collector current and direct-current amplification factor of the transistor Tr2.

The constant-current control section 15 has the following action expressions: VB=Vz2 (Zener voltage); VE=VB−VBE; IE=VE/R1; IE=IC+IB; and IB=IC/hfe. In this case, hfe takes a very large value, and therefore, almost no IB flows. Accordingly, IC is nearly equal to IE.

While IE is determined by VE and R1, VE has a value lower than VB by about 0.6 V and the value of VB is determined by the Zener diode D2. Accordingly, by suitably setting the values of Vz2 and R1 taking the above relations into account, it is possible to control the current flowing from the collector to a constant value.

Figure 16:
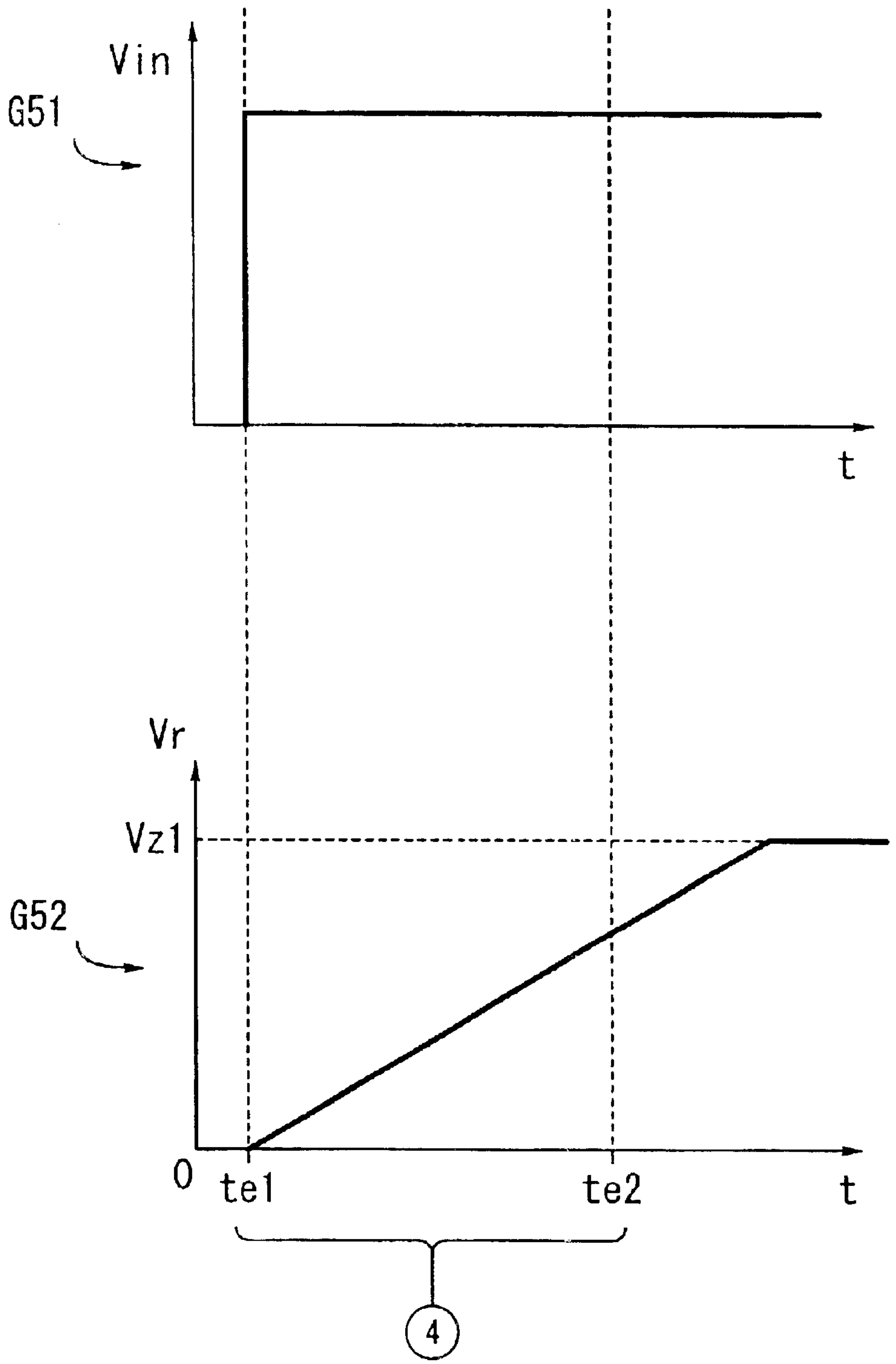
FIG. 16 is a diagram illustrating operation of the inrush current suppressing device.
Figure 17:
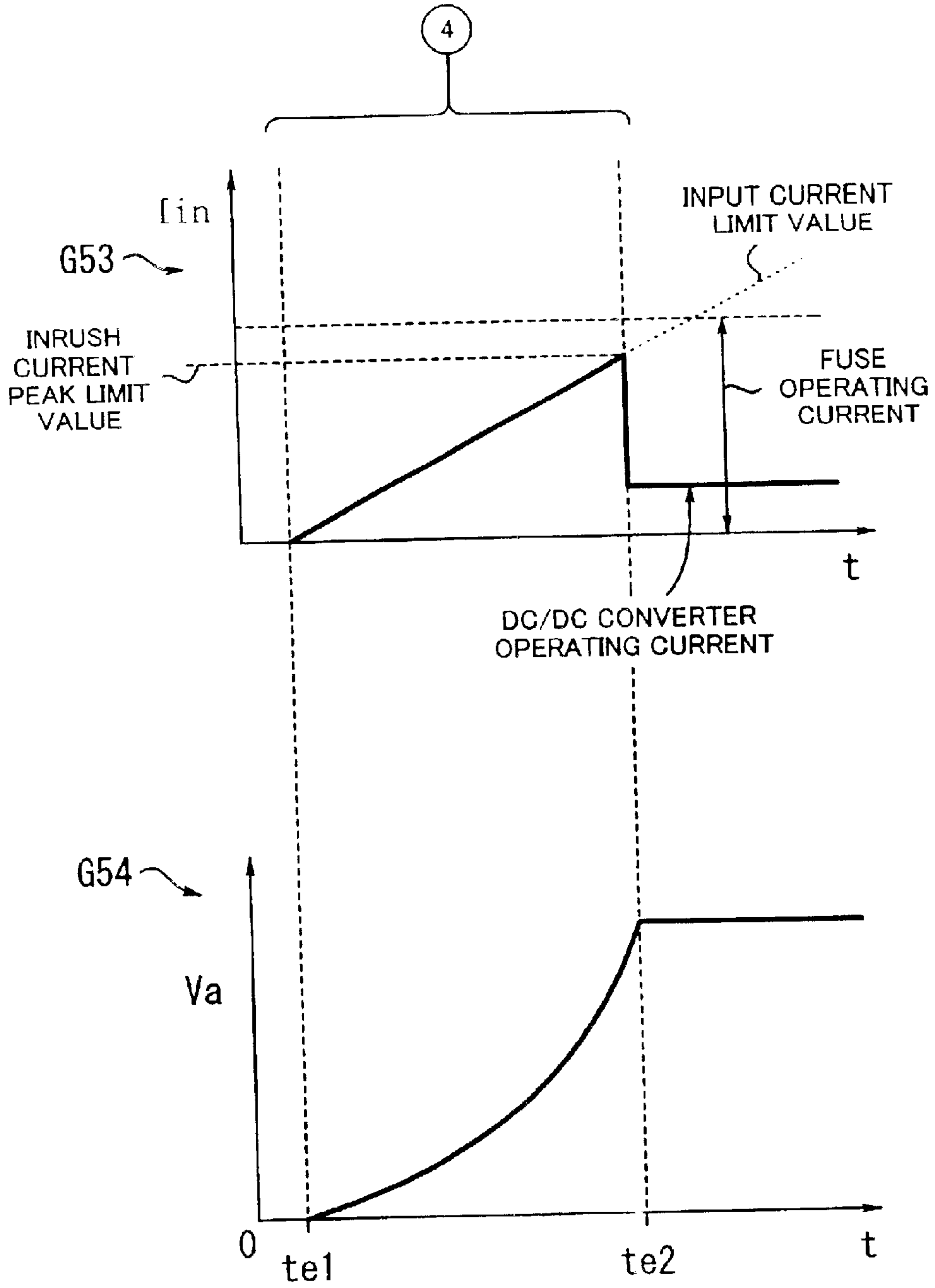
FIG. 17 is a diagram also illustrating the operation of the inrush current suppressing device.

FIGS. 16 and 17 illustrate operation of the inrush current suppressing device 10-2, wherein a graph G51 shows the waveform of the power supply Vin, a graph G52 shows the waveform of the sloping voltage Vr, a graph G53 shows the waveform of the current Iin, and a graph G54 shows the waveform of the input voltage Va applied to the input capacitor C0, the horizontal axes all representing a time base.

A difference between the first and second embodiments will be explained. In the first embodiment, because of charging in the CR circuit, the charging voltage of the capacitor C1 rises along a curve which progressively approaches an asymptote defined by the protection voltage Vz1 of the Zener diode D1, but in the second embodiment, the charging current of the capacitor C1 increases as a simple linear function because of the provision of the constant-current control section 15. In the second embodiment, therefore, the period of inrush current flow, the inrush current peak value, etc. can be set and calculated easily.

As described above, in the inrush current suppressing device 10 according to the present invention, feedback control is performed on the input current, and since the inrush current limit value can be determined independently of the characteristic of the current limiting element constituted by an FET, the inrush current can be suppressed without the need to additionally provide the DC/DC converter 20 with an operation delay circuit.

Further, at the start of power supply, the inrush current is suppressed, and during normal operation of the DC/DC converter 20, the input current limit value is increased to a level at which the fuse F functions properly, whereby perfect protection against an accidental short can be provided.

In the foregoing, the inrush current suppressing device 10 and the DC/DC converter 20 are described as separate devices, but the DC/DC converter 20 may be constructed such that the inrush current suppressing device 10 is incorporated therein.

As described above, in the inrush current suppressing device according to the present invention, the voltage signal obtained by detecting and converting the input current from the current limiting element is compared with the sloping voltage signal which is proportional to the time elapsed after the start of power supply. During the period in which the voltage signal is higher in level than the sloping voltage signal after the start of power supply, the input current limit value for suppressing the inrush current is output. Also, the input current limit value is gradually increased with increase in the sloping voltage signal. This permits the inrush current suppression control to be stabilized at all times, making it possible to improve the reliability and quality of the suppression control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An inrush current suppressing device for suppressing occurrence of inrush current, comprising:

- a current limiting element for limiting an input current flowing to a power supply circuit in accordance with an input current limit value;
- a current detecting section for detecting the input current flowing through the current limiting element and converting the detected current to a voltage signal;
- a sloping voltage signal generating section for generating a sloping voltage signal proportional to a time elapsed after start of power supply; and an input current limiting section for comparing the voltage signal with the sloping voltage signal, and for outputting the input current limit value for suppressing the inrush current and also gradually increasing the input current limit value with rise in the sloping voltage signal during a period in which the voltage signal is higher in level than the sloping voltage signal after the start of power supply.

2. The inrush current suppressing device according to claim 1, further comprising a protective element for protecting the power supply circuit when a fault has occurred in the power supply circuit.

3. The inrush current suppressing device according to claim 2, wherein the input current limiting section outputs the input current limit value in a manner such that during a period in which the inrush current flows, a relation of:

operating current of the protective element>the input current limit value;

is fulfilled, and that during operation of the power supply circuit, a relation of:

the operating current of the protective element<the input current limit value;

is fulfilled, where the input current limit value is equal to an inrush current peak limit value.

4. The inrush current suppressing device according to claim 1, wherein the sloping voltage signal generating section includes a CR circuit for generating the sloping voltage signal and a Zener diode for determining an upper-limit value of the sloping voltage signal, and generates the sloping voltage signal in a manner such that during a period in which the inrush current occurs, charging voltage of the capacitor rises along a curve which progressively approaches an asymptote defined by the upper-limit value.

5. The inrush current suppressing device according to claim 1, wherein the sloping voltage signal generating section includes a capacitor, a constant-current control section for charging the capacitor with a constant current and a Zener diode for determining an upper-limit value of the sloping voltage signal, and generates the sloping voltage signal in a manner such that during a period in which the inrush current occurs, charging voltage of the capacitor rises as a linear function along a straight line.

6. A communication device of hot-line insertable/removable type for performing communication control, comprising:

a connector to be connected to a power supply section;

a power supply circuit for receiving electric power from the power supply section and converting the received power to a voltage necessary for a load; and an inrush current suppressing section including a current limiting element for limiting an input current flowing to the power supply circuit in accordance with an input current limit value, a current detecting section for detecting the input current flowing through the current limiting element and converting the detected current to a voltage signal, a sloping voltage signal generating section for generating a sloping voltage signal proportional to a time elapsed after start of power supply, and an input current limiting section for comparing the voltage signal with the sloping voltage signal, and for outputting the input current limit value for suppressing the inrush current and also gradually increasing the input current limit value with rise in the sloping voltage signal during a period in which the voltage signal is higher in level than the sloping voltage signal after the start of power supply.

7. The communication device according to claim 6, further comprising a protective element for protecting the power supply circuit when a fault has occurred in the power supply circuit.

8. The communication device according to claim 7, wherein the input current limiting section outputs the input current limit value in a manner such that during a period in which the inrush current flows, a relation of:

operating current of the protective element>the input current limit value;

is fulfilled, and that during operation of the power supply circuit, a relation of:

the operating current of the protective element<the input current limit value;

is fulfilled, where the input current limit value is equal to an inrush current peak limit value.

9. The communication device according to claim 6, wherein the sloping voltage signal generating section includes a CR circuit for generating the sloping voltage signal and a Zener diode for determining an upper-limit value of the sloping voltage signal, and generates the sloping voltage signal in a manner such that during a period in which the inrush current occurs, charging voltage of the capacitor rises along a curve which progressively approaches an asymptote defined by the upper-limit value.

10. The communication device according to claim 6, wherein the sloping voltage signal generating section includes a capacitor, a constant-current control section for charging the capacitor with a constant current and a Zener diode for determining an upper-limit value of the sloping voltage signal, and generates the sloping voltage signal in a manner such that during a period in which the inrush current occurs, charging voltage of the capacitor rises as a linear function along a straight line.

* * * * *